(12) United States Patent
Payne

(10) Patent No.: US 7,379,219 B2
(45) Date of Patent: May 27, 2008

(54) METHOD AND APPARATUS FOR ILLUMINATING A COMPUTER GENERATED HOLOGRAM

(75) Inventor: Douglas Payne, Farnborough (GB)

(73) Assignee: F. Poszat Hu, LLC, Wilmington, DE (US)

(*) Notice: Subject to any disclaimer, the term of this patent is extended or adjusted under 35 U.S.C. 154(b) by 0 days.

(21) Appl. No.: 10/488,543

(22) PCT Filed: Aug. 22, 2002

(86) PCT No.: PCT/GB02/03879

§ 371 (c)(1),
(2), (4) Date: Mar. 16, 2004

(87) PCT Pub. No.: WO03/021363

PCT Pub. Date: Mar. 13, 2003

(65) Prior Publication Data

US 2004/0263930 A1    Dec. 30, 2004

(30) Foreign Application Priority Data

Sep. 4, 2001  (GB) .................................. 0121412.1

(51) Int. Cl.
*G03H 1/08* (2006.01)
*G02B 5/32* (2006.01)

(52) U.S. Cl. ................................ 359/9; 359/15; 359/32

(58) Field of Classification Search ................. 359/13, 359/15, 22, 23, 24, 32, 33, 9; 430/1
See application file for complete search history.

(56) References Cited

U.S. PATENT DOCUMENTS

| 5,145,756 A | * | 9/1992 | Windeln et al. ................ 430/1 |
| 5,285,438 A | * | 2/1994 | Marchand et al. ........... 369/103 |
| 5,539,543 A | * | 7/1996 | Liu et al. ....................... 359/15 |
| 5,561,537 A | * | 10/1996 | Aritake et al. ................ 359/23 |
| 5,594,559 A | * | 1/1997 | Sato et al. ....................... 359/8 |
| 5,724,161 A | * | 3/1998 | Smith et al. .................. 359/13 |

FOREIGN PATENT DOCUMENTS

| WO | 99/00993 A | 1/1999 |
| WO | 00/75698 A | 12/2000 |

OTHER PUBLICATIONS

Meano et al; "Electro-Holographic Display Using 15Mega Pixels LCD"; Proceedings of the SPIE, SPIE. Bellingham. VA, US. vol. 2652, 1995, pp. 15-23. XP000923279.

* cited by examiner

*Primary Examiner*—Audrey Chang
(74) *Attorney, Agent, or Firm*—Stolowitz Ford Cowger LLP

(57) ABSTRACT

A holographic display comprising a spatial light modulator, SLM, for displaying a computer generated hologram, CGH, containing horizontal or vertical parallax only, HPO, means for illuminating the SLM, and means for guiding light reflected from the SLM to a display region, the means for illuminating the SLM comprising a vertically/horizontally oriented line light source.

17 Claims, 4 Drawing Sheets

METHOD AND APPARATUS FOR ILLUMINATING A COMPUTER GENERATED HOLOGRAM

This application is the US national phase of international application PCT/GB02/03879, filed in English on 22 Aug. 2002, which designated the US. PCT/GB02/03879 claims priority to GB Application No. 0121412.1 filed 4 Sep. 2001. The entire contents of these applications are incorporated herein by reference.

The present invention relates to a method and apparatus for illuminating a computer generated hologram and more particularly to a method and apparatus for illuminating a computer generated hologram to generate a horizontal parallax only image.

It is well known that a three-dimensional image may be presented by forming an interference pattern or hologram on a planer surface. The three-dimensional image is visible when the hologram is appropriately illuminated. Recently, interest has grown in so-called computer generated holograms (CGHs) which offer the possibility of displaying high quality images, which need not be based upon real objects, with appropriate depth cues and without the need for viewing goggles. Interest is perhaps most intense in the medical and design fields where the need for realistic visualisation techniques is great.

Typically, a computer generated hologram involves the generation of a matrix of data values (each data value corresponding to a light transmission level) which simulates the hologram which, might otherwise be formed on a real planer surface. The matrix is applied to a Spatial Light Modulator (SLM) which may be, for example, a two-dimensional array of liquid crystal elements or of acousto-optic modulators. Coherent light is directed onto the SLM using for example a laser such that the resulting output, either reflected from the SLM or transmitted through the SLM, is a modulated light pattern. An example of an SLM is an Electrically Addressed SLM (EASLM).

In order to produce a three-dimensional image of usable size and viewing angle, the SLM typically has to have a large number of pixels, e.g. $10^{10}$. In addition, the pixels of the SLM must be positioned relative to one another with a high degree of accuracy. The device must also be capable of modulating coherent light, e.g. produced by a laser. These requirements are extremely demanding and expensive to achieve in practice.

A critical characteristic of a hologram is the parallax which it presents to the viewer, i.e. presentation of different images at different view points, and which allows the viewer to perceive a stereo image. In order to display an image with full parallax (in both the horizontal and the vertical directions) the hologram must contain a very large number of pixels which make the CGH very time consuming to compute. In addition, full parallax holograms require high pixel count display devices, adding to the complexity and cost of the display system. A dramatic reduction in pixel count can be achieved if no vertical parallax is provided in a hologram, taking advantage of the fact that a viewer's eyes are usually aligned horizontally and only horizontal parallax is required. Such a hologram is referred to as a horizontal parallax only (HPO) hologram, and results in an image which remains the same when the viewer's eyes move up and down but changes to provide the appropriate perspective view when his eyes move from side to side. Of course, if only vertical parallax is required a similar reduction in pixel count can be achieved.

A commonly used method of displaying a HPO CGH is to use a cylindrical lens combined with a conventional (e.g. spherical) lens such that an image of the hologram is formed in the vertical direction, and its Fourier transform (i.e. that contains information about a horizontal slice through the 3-dimensional image) is formed in the horizontal direction. Each horizontal row in the replayed image is a 1-dimensional Fourier transform of a row in the CGH. The hologram is conventionally illuminated by a single well-defined wavefront, which may be produced using a point source and collimating optics. The resulting wavefront is usually plane, but does not need to be so. The use of a single wavefront to illuminate the hologram has a detrimental effect on the image: the brightness of the image in the vertical direction is non-uniform with a bright horizontal band appearing in the image at a position (in the vertical direction) which changes with the vertical viewing angle.

For conventional imaging systems, this effect is well known and has been described for example in Principles of Holography, H. M. Smith, John Wiley & Sons Inc, 2nd Ed., 1975 (p21 2nd paragraph). A demonstration of the effect is described where a transparency is illuminated with a point source (e.g. a single wavefront). A viewer looking at the transparency will see that the part that is on a line between their eyes and the source will appear much brighter than the rest of it. If the transparency were to be imaged onto a diffuse screen (as with an overhead projector), then the whole image should appear uniformly bright from a wide range of viewing angles.

A known method for increasing brightness uniformity in the vertical direction in a HPO CGH display system is to use a special diffuser in the output plane, i.e. between the cylindrical lens and the viewer. The diffuser is designed to scatter light in the vertical direction only, while preserving the phase of the light in the horizontal direction (it is important to avoid scattering in the horizontal direction as this would disrupt the required Fourier transform in this direction). One such diffuser is a screen comprising a stack of cylindrical lenses (each with its longitudinal axis extending horizontally and having dimensions on the order of 1 mm). This type of screen is known as a "lenticular" screen. An alternative diffuser structure comprises a diffraction grating having its grating lines aligned horizontally.

A system employing a diffuser is illustrated in FIG. 1. In this example, a SLM 1 operating in transmission mode is used to display a CGH (the SLM is typically an electrically addressable SLM). A point light source 2 is positioned at the focal point of collimating optics 3 such that the SLM 2 is illuminated with a substantially plane wave. The light transmitted by the CGH is imaged in the vertical direction and Fourier transformed in the horizontal direction by a combination of conventional spherical optics 4 and cylindrical optics 5. A 3D image 6 appears to the viewer to be located in the image/Fourier plane of the replay optics. A bright line 7 known as the DC line is formed in this plane by light that is not diffracted by the CGH. A conjugate image 8 will also normally be formed on the opposite side of the DC line to the desired image. The DC line and conjugate image are normally blocked by screens. A vertically diffusing screen 9 is shown intersecting the image. A similar arrangement may be constructed in which the SLM is operated in reflection mode. One such arrangement is described in GB2330471A. This patent application describes a process referred to as Active Tiling™ for displaying the CGH on an optically addressable spatial light modulator (OASLM).

The use of a diffuser has however two serious disadvantages. Firstly, an optimum diffuser is very difficult and expensive to produce. Secondly, the diffuser intersects the 3D image preventing the viewer from being able to place their hand within it. Consequently, this method could not be used in systems employing a "haptic" interface which enable the viewer to interact with the image in a natural fashion, e.g. to "touch" the image.

It is an object of the present invention to facilitate the display of a single parallax holographic image without the need for a diffuser.

According to a first aspect of the present invention there is provided a holographic display comprising a spatial light modulator, SLM, for displaying a computer generated hologram, CGH, containing parallax substantially only in a single direction, means for illuminating the SLM, and means for guiding light reflected from the SLM to a display region, the means for illuminating the SLM comprising a line light source.

The line light source provides light which is diffuse only in the vertical or horizontal direction. Each point along the line may be considered to be emitting a spherical wavefront. Thus, the source produces multiple waves each of which illuminates the SLM from a different angle with respect to the vertical/horizontal axis. Preferably, the SLM is illuminated with plane waves from a near continuous range of vertical angles. By use of appropriate optics (e.g. a lens placed one focal length away from the line light source), the multiple spherical wavefronts arising from the source may be transformed into the desired multiple plane waves. Such optics are referred to as being collimating.

Embodiments of the present invention provide improved brightness uniformity in the vertical direction, whilst not restricting a viewer's ability to interact with the image.

Preferably, the line light source is substantially vertically or horizontally oriented depending upon the direction of the single parallax contained in the CGH.

The SLM of the holographic display may be an optically addressed spatial light modulator, OASLM. The display may comprise replicating optics for replicating a holographic image displayed on an electrically addressed spatial light modulator, EASLM on a rear surface of the OASLM, with said means for illuminating the SLM being arranged to direct light onto a front surface of the OASLM. Alternatively, said SLM of the display may be an EASLM.

Preferably, the line light source may comprise a linear array of discrete light sources, with each of the sources being substantially spatially coherent (point like). Each of the sources may be a laser or a light emitting diode (LED).

The line light source may alternatively comprise a single light source and a scanning mirror arranged to scan the output of the light source along a linear path. Other possible line light sources include a flattened optical fibre bundle, a side emitting optical fibre, and a system for generating a collimated light beam in combination with a cylindrical lens having its longitudinal axis aligned such that it illuminates a diffusing screen with a line.

It is well known in the field of holography that the image replayed from a hologram will suffer from blurring if the illumination is not monochromatic or at least narrow band. Such illumination is referred to as being temporally coherent. If the light sources (listed above) are not considered sufficiently narrow band, then spectral filters are readily available that can ensure the light illuminating the hologram has a sufficiently narrow bandwidth.

According to a second aspect of the present invention there is provided a method of displaying a hologram having substantially only a single parallax, the method comprising displaying a holographic image on a spatial light modulator, SLM, illuminating the SLM with a light originating from a line light source, and guiding light reflected from the SLM to a display region.

For a better understanding of the present invention and in order to show how the same may be carried into effect reference will now be made, by way of example, to the accompanying drawings, in which.

Figure 1:
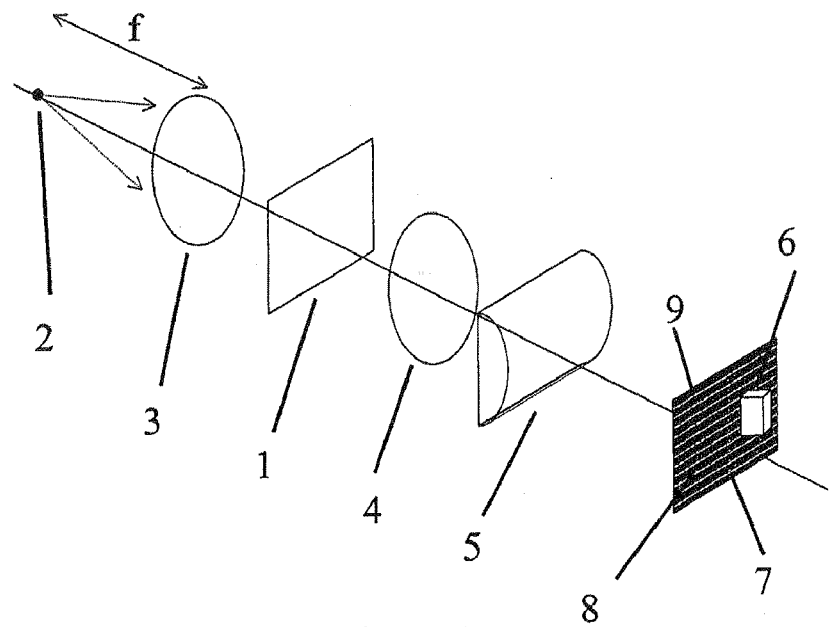
FIG. 1 illustrates a prior art system for illuminating a HPO CGH with a single wavefront, and comprising a vertically diffusing screen intersecting the 3D image.
Figure 2:
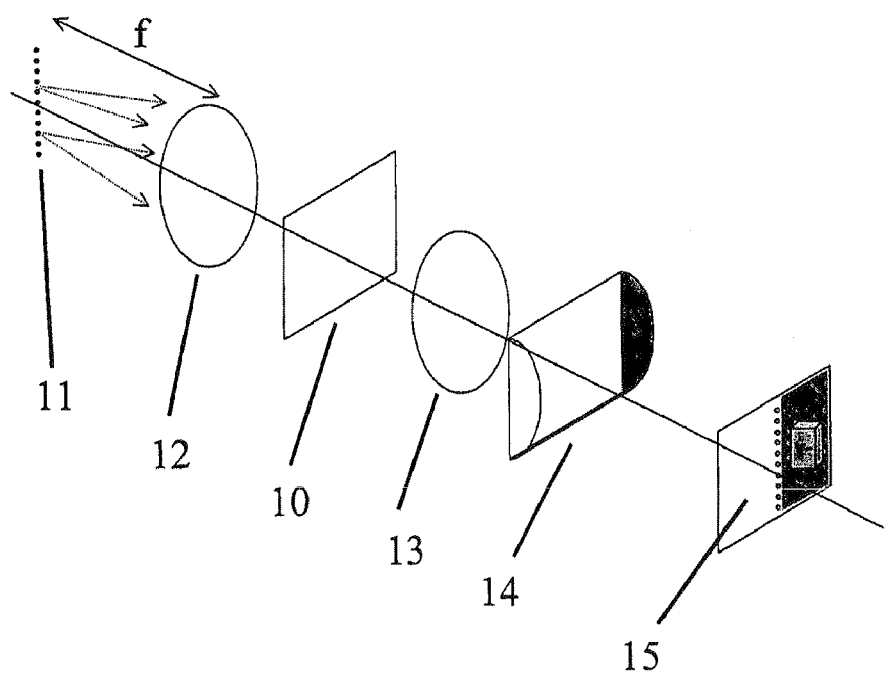
FIG. 2 illustrates the use of a line light source to illuminate a SLM, operating in transmission mode, of a holographic display.
Figure 3:
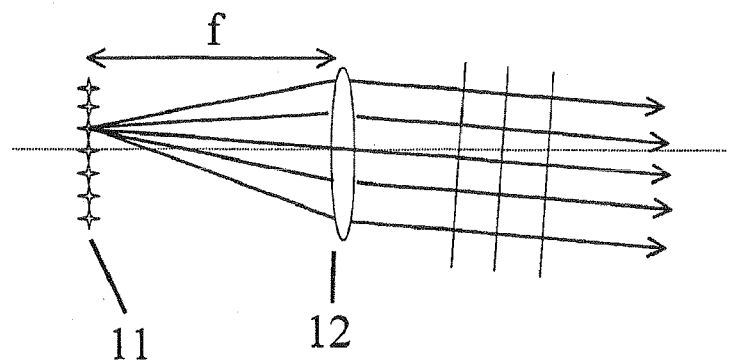
FIG. 3 shows a ray trace for light generated by a point in the light source of FIG. 2.

FIG. 2 illustrates a holographic display in which a CGH is displayed on a spatial light modulator (SLM) 10 operating in transmission mode. A vertical line light source 11 is located behind the SLM 10. The line light source 11 produces monochromatic light (<10 nm wavelength bandwidth) which is coherent in the horizontal direction but incoherent in the vertical direction. The line light source 11 is positioned in the focal plane of collimating optics 12 such that the surface of the SLM 10 is illuminated with a series of plane waves which are incident upon the front surface of the SLM 10 from different directions (with respect to the vertical axis). The light rays generated by one point in the line light source 11 are illustrated in FIG. 3. FIG. 2 also illustrates replay optics 13, 14 which are arranged to guide light transmitted through the SLM 10 to a display region 15. A vertically diffusing screen is no longer required to intersect the 3D image 10.

Figure 4:
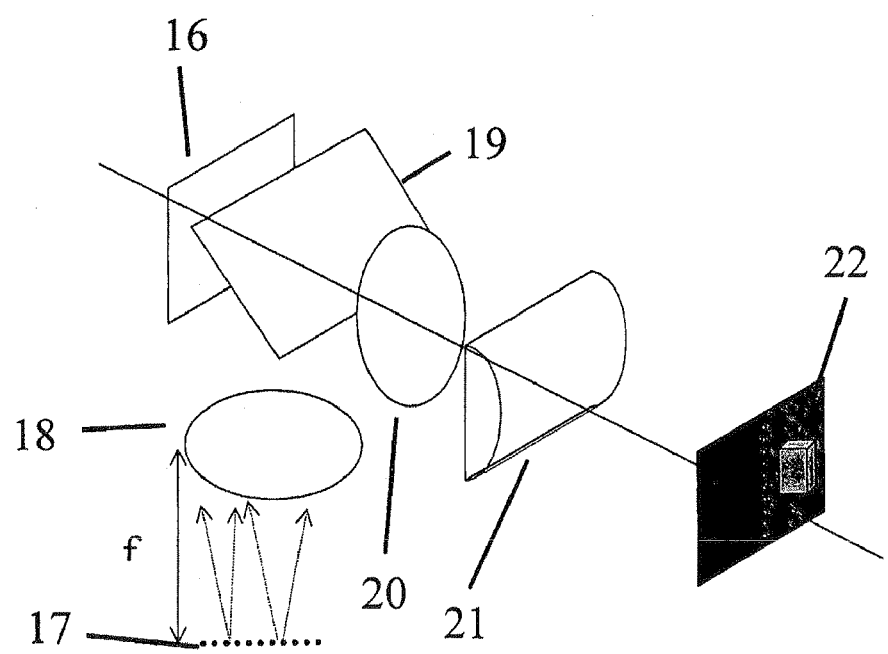
FIG. 4 illustrates the use of a line light source to illuminate a SLM, operating in reflection mode, of a holographic display.

FIG. 4 illustrates schematically the method of the present invention applied to a CGH displayed on a SLM 16 operated in a reflection mode. The line light source 17 is positioned in the focal plane of collimating optic 18 such that the plane waves illuminate a beam splitter 19. These waves reflect from the beam splitter 19 and illuminate the CGH on the SLM 16. The waves then reflect from the CGH and pass through the beam splitter 19 and the remainder of the replay optics 20,21 to form an image 22.

Figure 5:
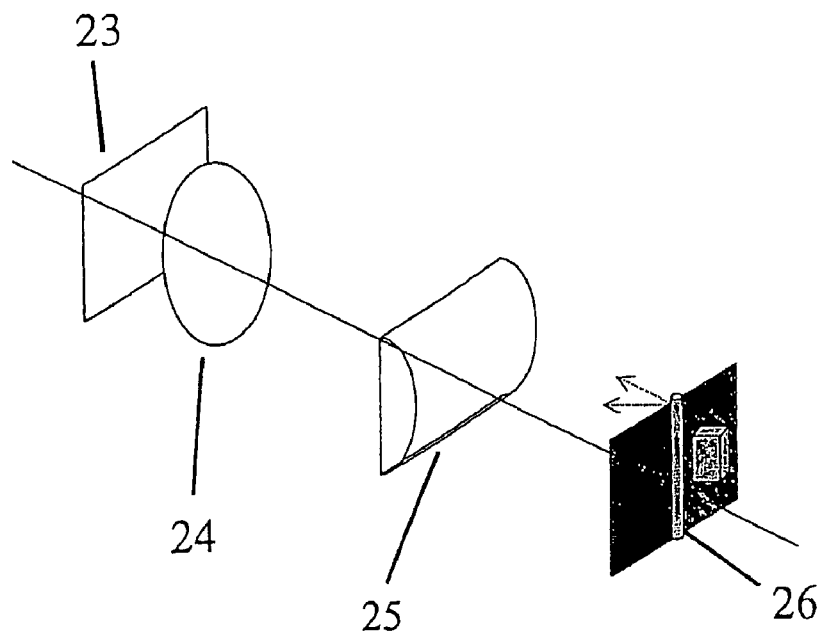
FIG. 5 illustrates a compact holographic display utilising a line light source at the DC line position.

FIG. 5 illustrates schematically the method of the present invention applied to a CGH displayed on a SLM 23 operated in a reflection mode, but with the replay optics 24,25 also acting as the collimating optics, thus yielding a more compact system. It is known that some light will be reflected from the SLM 23 without being diffracted (i.e. specularly reflected light) and that this light will be focussed onto the display plane. Where the light source is a line light source, the light will be focussed onto a "DC" line in the display plane. If a vertical line light source is located at the DC line position, the reverse mechanism will mean that the CGH will be illuminated with multiple waves from a range of vertical angles. FIG. 5 shows a line light source 26 located at this position. Light from this source 26 passes through the replay optics 24,25 and illuminates the CGH with multiple waves from a range of vertical angles. The light then reflects from the CGH and passes through the replay optics 24,25 again to form an image as previously described.

There are illustrated in FIG. 6 a number of possible line source systems. FIG. 6a illustrates a cylindrical lens with a beam of collimated light being directed onto the planar surface of the lens. The collimated beam may be provided by a point source (such as a laser) and a collimating lens. The light emerging from the convex surface of the cylindrical lens produces a line of light on a diffusing screen (which may be a sheet of glass with a roughened surface). The embodiment of FIG. 6b similarly uses a diffusing screen. However, in this case light is incident upon a scanning mirror which scans a point of light across the diffusion screen in a vertical line. Provided the scanning is rapid enough, this yields the appearance of a line of light. In both these cases (FIGS. 6a and 6b), the diffusing screen ensures that points along the line give rise to multiple spherical waves as desired (e.g. the light is diffuse).

Figure 6A:
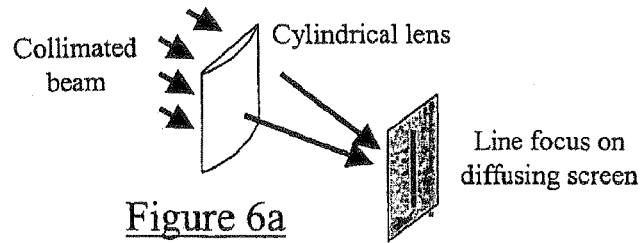
FIGS. 6a to 6e illustrate alternative vertical line light sources.
Figure 6B:
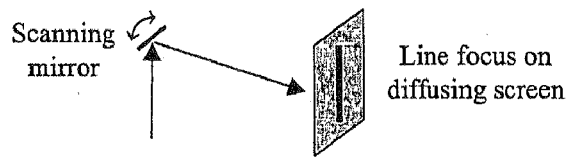
Figure 6C:
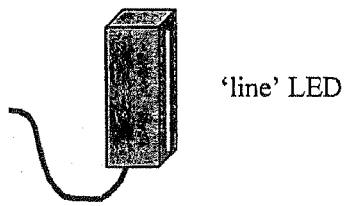

FIG. 6c illustrates a line emitter which comprises a line of discrete LEDs. In this embodiment, as the emitted light is already diffuse in the vertical direction there is no need for a diffusing screen.

Figure 6D:
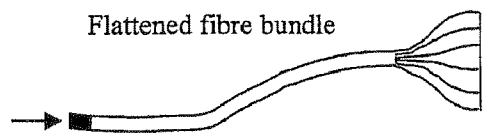

FIG. 6d illustrates a bundle of optical fibres which is flattened out at its end to provide a line of fibre light sources. Experimental tests have shown that such a flattened fibre bundle may result in non-uniform light output due to the differing output of individual fibres. The light output may be made uniform by placing a diffuser in front of the output ends of the fibres.

Figure 6E:

FIG. 6e illustrates the use of a single optical fibre, where light is introduced into the end of the fibre and is scattered out of its sides. The scattering may be caused by particulates within the fibre, by microstructure on its surface or by sharp bends in the fibre. The degree of scattering along the fibre needs to be carefully controlled to ensure uniform brightness along its length.

Figure 7:
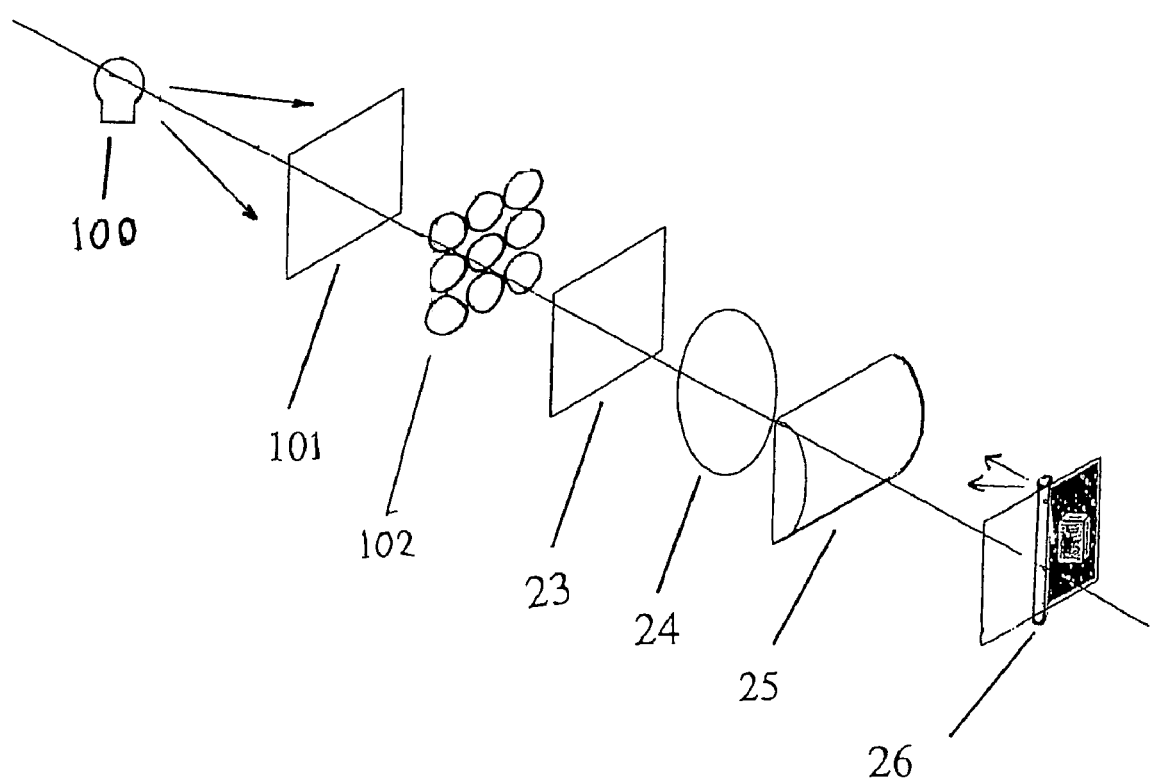
FIG. 7 illustrates the use of optics to replicate a fringe pattern.

FIG. 7 illustrates an embodiment of the present invention wherein replicating optics 102 are used to replicate a fringe pattern from an EASLM 101 onto the rear surface of OASLM 23 with the arrangement of FIG. 5 directing light onto the front surface of OASLM 23.

Examples of these line light sources are commercially available and are commonly used where structured lighting is required for machine vision applications (e.g. inspecting items on a production line). Line light sources of arbitrary length may be made by butting shorter lengths together. Additional optics for these sources such as long cylindrical lenses that modify the light output are also commercially available.

It will be appreciated by the person of skill in the art that various modifications may be made to the above described embodiments without departing from the scope of the present invention. For example, the line light source need not be vertical and could be curved. This may be particularly desirable where a curved line can be used to compensate for aberrations in the display system. The line light source, linear or curved, may also deviate somewhat from the vertical. It will also be appreciated that the HPO CGH is only an example of a single parallax CGH. The invention may be applied to Vertical Parallax Only CGHs, or indeed to CGHs having a single parallax in some other direction.

The invention claimed is:

1. A holographic display system for displaying holographic images, said images having parallax substantially only in a single direction, said display comprising:

a spatial light modulator, SLM, having an active area for displaying a computer generated hologram, CGH, a diffuse line light source, each portion of said light source illuminating the active area of said SLM, and optics for guiding light modulated by the SLM to a display region.

2. A display according to claim 1, wherein said single parallax direction is horizontal.

3. A display according to claim 2, wherein the line light source is vertically oriented.

4. A display according to claim 1, wherein said single parallax direction is vertical.

5. A display according to claim 4, wherein the line light source is horizontally oriented.

6. A display according to claim 1, wherein the SLM of the holographic display is an optically addressed spatial light modulator, OASLM.

7. A display according to claim 6 and comprising replicating optics for replicating fringes representative of a holographic image displayed on an electrically addressed spatial light modulator, EASLM on a rear surface of the OASLM, with said means for illuminating the SLM being arranged to direct light onto a front surface of the OASLM.

8. A display according to claim 1, wherein the SLM is an EASLM.

9. A display according to claim 1, wherein the means for illuminating the SLM comprises collimating optics arranged between the line light source and the SLM.

10. A display according to claim 1, wherein the line light source comprises a linear array of discrete light sources, with each of the sources being substantially a point source.

11. A display according to claim 1, wherein the line light source comprises a light source and a scanning mirror arranged to scan the output of the light source along a linear path.

12. A display according to claim 1, wherein the line light source comprises a line LED, a flattened optical fibre bundle, or an edge emitting optical fibre.

13. A display according to claim 1, wherein the line light source comprises a source of collimated light and a cylindrical lens arranged in front of the light source.

14. A display according to claim 1, wherein said line light source is arranged so that the generated light originates from or appears to originate from said display region.

15. A display according to claim 14, wherein said light originates from or appears to originate from a DC line area of the display region.

16. A method of displaying a hologram having parallax substantially in a single direction only, the method comprising the steps of:

displaying fringes representative of a holographic image on an active area of a spatial light modulator, SLM, illuminating the SLM with a diffuse line light source, each portion of said light source illuminate the active area of said SLM, and guiding light modulated by the SLM to a display region.

17. A method according to claim 16, wherein the line light source is vertically or horizontally aligned.

* * * * *